UNITED STATES PATENT OFFICE.

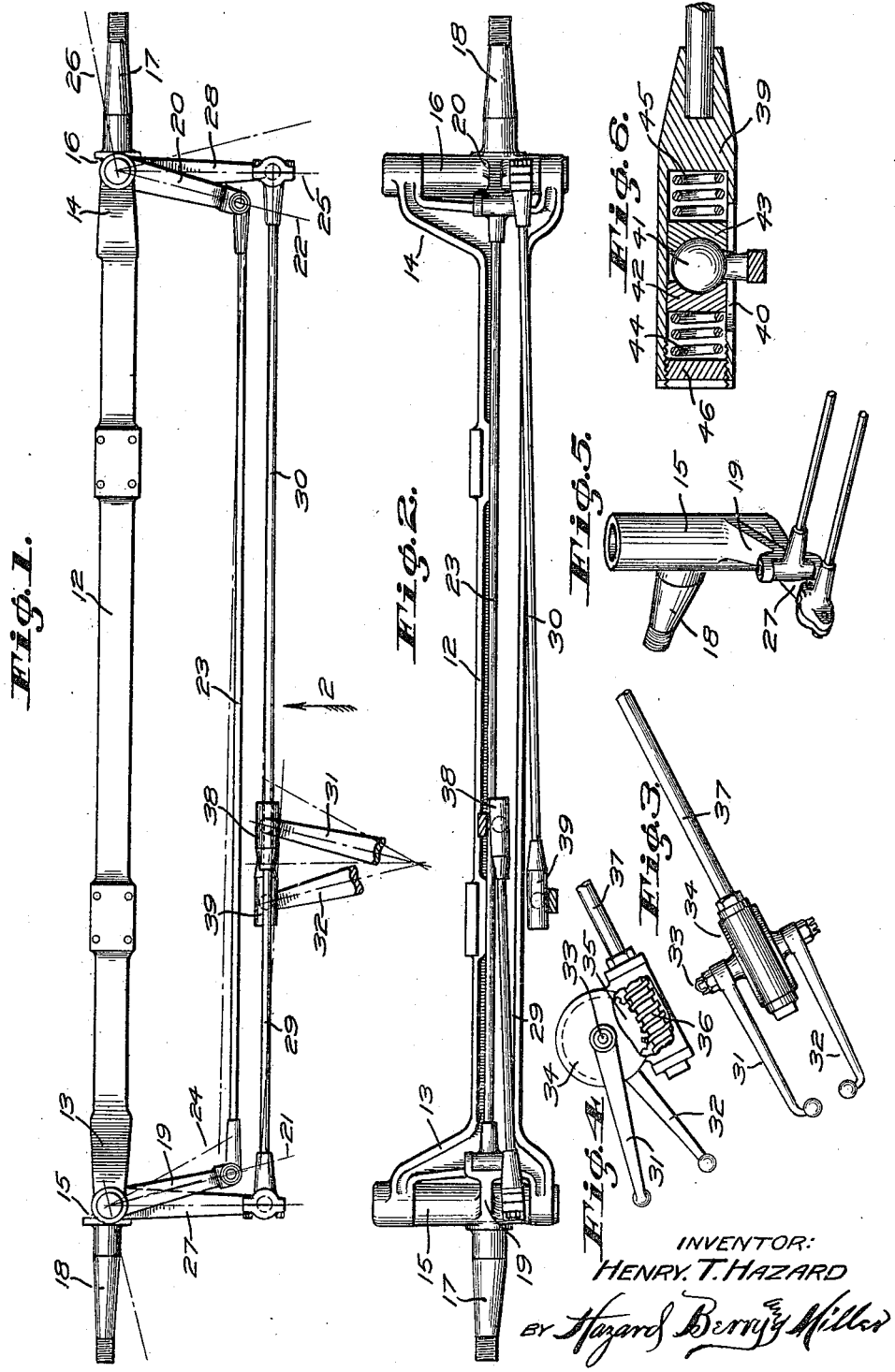

HENRY T. HAZARD, OF LOS ANGELES, CALIFORNIA.

STEERING MECHANISM.

1,271,706.

Specification of Letters Patent. Patented July 9, 1918.

Application filed August 30, 1916. Serial No. 117,750.

*To all whom it may concern:*

Be it known that I, HENRY T. HAZARD, a citizen of the United States, residing at Los Angeles, in the county of Los Angeles and State of California, have invented new and useful Improvements in Steering Mechanism, of which the following is a specification.

This invention relates to a steering mechanism for vehicles such as automobiles and the like, and particularly pertains to a modified form of the type of steering mechanism set forth in United States Patent #1,111,693, issued to me September 22, 1914, and in an application filed by me June 30, 1914, Serial Number 848,261.

The steering mechanism of the above type embodies the ordinary steering knuckle form of steering gear, comprising a pair of steering knuckles carried by the wheel spindles on which the front wheels of the vehicle are mounted, and which knuckles are provided with tie rod supporting arms connected together by a tie rod in such manner that the front wheels will traverse the proper concentric arcs in turning.

The broad invention embodied in the above-named patent and application and the present application resides in a duplex drag link connection between the steering column and the steering knuckles, so constructed and arranged as to act in conjunction with the tie rod on turning the front wheels of the vehicle in directing its course of travel.

It is the object of this invention to provide a modified form of construction whereby the drag link connections between the steering knuckles and the steering column may be arranged to extend transversely of the vehicle body substantially parallel with and adjacent to the tie rod.

The invention is illustrated in the accompanying drawings in which:

Figure 1 is a plan view showing part of the steering gear with the wheels removed.

Fig. 2 is a view of same in elevation as seen in the direction indicated by the arrow —2— in Fig. 1.

Fig. 3 is a view in side elevation with parts broken away, showing the steering cranks and the manner of gearing same to the steering column.

Fig. 4 is a plan view of same.

Fig. 5 is a detail in perspective of the steering knuckle.

Fig. 6 is a detail section showing the yieldable connection between the steering cranks and the drag links.

More specifically, 12 indicates the forward axle of a vehicle, formed with yokes 13 and 14 at its ends in which steering knuckles 15 and 16 are pivotally mounted. The steering knuckles are formed with wheel spindles 17 and 18 on which the front wheels (not shown) of the vehicle are adapted to be mounted. Tie rod supporting arms 19 and 20 are formed on the steering knuckles and are here shown as extending rearwardly of the axle. The tie rod supporting arms are arranged on the steering knuckles in relation to the wheel spindles in such manner that when the spindles are in alinement with each other the tie rod supporting arms will extend from the pivotal centers of the steering knuckles on lines 21 and 22 projected from these centers to the center of the vehicle rear axle, thus disposing the tie rod supporting arms in convergent relation to each other when the parts are in their normal straight ahead position, as shown in Fig. 1. The usual tie rod 23 is pivotally connected at its ends to the tie rod supporting arms 19 and 20 so that the turning movement of one of the steering knuckles will cause the other steering knuckle to turn in the same direction but on a different length of arc of travel. For example, referring to Fig. 1, assume the tie rod supporting arm 19 to move from its normal position on line 21, inwardly to a position indicated by line 24. The tie rod supporting arm 20 will then move from the line 22 to the position indicated by line 25 as in directing the vehicle to the left; the tie rod supporting arm 20 and the steering knuckle 16 being moved on a shorter arc so that the wheel spindle 17 will assume a smaller angle in relation to the axle 12 than will the spindle 18, as indicated by the line 26, as is common in steering mechanism of this character. The movement of either tie rod supporting arm 19 or 20 inwardly from their normal positions on the lines 21 and 22 will effect a shortening of the length of arc of travel of the other tie rod supporting arm outwardly from the lines 21 and 22, and conversely the movement of either tie rod supporting arm 19 or 20 outwardly from the lines 21 and 22 will effect an increased length of travel of the other tie rod supporting arm inwardly from the lines 21 and 22 to effect the proper position of the wheels in traversing curves or turnings.

The steering knuckles 15 and 16 are formed with steering arms 27 and 28 which extend rearwardly from the steering knuckles at right angles to the spindles 17 and 18, the steering arms being here shown as extending beneath the tie rod supporting arms. Connected to the outer ends of each of the steering arms are inwardly extending drag links 29 and 30 which are arranged substantially parallel with the tie rod but are inclined from their connections with the steering arms so that their inner ends will overlap in spaced relation to each other. The inner ends of the drag links 29 and 30 are yieldably connected to a pair of divergent steering cranks 31 and 32, respectively, which are disposed on spaced parallel inclined planes, as particularly shown in Fig. 3 and secured at the upper and lower ends of a forwardly inclined rock shaft 33: the steering cranks diverging at like angles on opposite sides of the vertical plane of the rock-shaft, when in their normal central position.

The steering cranks correspond in length to the steering arms and the angle of each steering crank in relation to the vertical center line of the rock shaft corresponds to the angle of the tie rod supporting arms in relation to the steering arms.

The inner ends of the drag links thus cross and extend past the rock shaft and connect with the opposite steering cranks; that is the right hand drag link connects with the left hand steering crank, and the left hand drag link connects with the right hand steering crank on opposite sides of the center line of the rock shaft. This arrangement combined with the corresponding angular relation of the steering cranks and the tie rod supporting arms is important, in that the arcs of travel of the swinging ends of the steering cranks will meet the varying stroke of the tie rod supporting arms.

The rock shaft is supported in suitable bearings in a housing 34 and is fitted with a worm gear 35 interposed between the steering cranks and which worm gear meshes with a worm 36 mounted on a steering column 37 extending at right angles to the rock shaft 33 and on a plane of inclination corresponding to that of the steering cranks 31 and 32, crank 31 being in a plane above the inclined plane of the steering column and crank 32 below said inclined plane.

The yieldable swivel connections between the drag links and the steering cranks comprise sockets 38 and 39 carried on the outer ends of the drag links, each of which sockets is formed with a side slot 40, as shown in Fig. 5, through which the ends of the steering cranks extend. The steering cranks are formed with ball terminals 41 which are arranged in the sockets 38 and 39 in a split socket formed by follower blocks 42 and 43 slidably mounted within the sockets and held in contact with the terminals of the steering cranks by means of springs 44 and 45 interposed between the follower blocks 42 and 43 and the ends of the sockets. The outer ends of the sockets are formed of threaded plugs 46 adapted to be removed and replaced to permit the assembling of the yieldable swivel connection. This connection permits of a longitudinal movement of the drag links in either direction in relation to the steering cranks, which is essential on relative movement of the vehicle axle and the vehicle body.

By the foregoing construction, duplex connections are provided between the steering column and the steering knuckles so that breakage of either of the tie rod supporting arms, either of the steering arms, either of the steering cranks, either of the drag links or the tie rod will not render the steering mechanism inoperative. The worm and worm gear each having a plurality of threads, any thread in either of the same may be broken without disabling the steering mechanism.

In operation, rotation of the steering column will operate through the worms and gear to rock the rock-shaft, causing the steering cranks to move in unison in corresponding directions, which operates to move the drag links transversely of the vehicle which in turn rocks the steering knuckles through the steering arms.

I claim:

1. A steering mechanism comprising a pair of steering knuckles, wheel spindles thereon, steering arms on the steering knuckles at right angles to the wheel spindles, tie rod supporting arms on the steering knuckles arranged at an angle to the steering arms, a tie rod connecting the tie-rod supporting arms, a rock shaft disposed in a vertical plane, a pair of divergent steering cranks on said rock-shaft arranged at an angle on opposite sides of the center of the rock-shaft corresponding to the angle between the tie rod supporting arms and the steering arms, a pair of drag links connected to steering arms and extending toward each other substantially parallel with the tie rod with their inner ends overlapping and projecting past the rock-shaft into engagement with the steering crank on the opposite side of the rock shaft, and a worm gear on the rock shaft interposed between the steering cranks, a steering column, and a worm on said steering column meshing with the worm gear.

2. A steering mechanism comprising a pair of vertically pivoted steering knuckles mounted at the opposite ends of a vehicle axle, spindles extending outwardly from said knuckles, steering arms secured to said knuckles and disposed substantially at right angles to the spindles, tie rod supporting arms secured to said knuckles and disposed at equal angles to the steering arms and inclined toward each other; said arms being shorter than the steering arms and of equal length; a rigid tie rod pivotally connecting the tie rod supporting arms, a rock-shaft disposed in a vertical plane at a point in the rear of the tie rod and between the ends thereof, a pair of steering cranks secured to said rock-shaft; said cranks extending toward the tie rod and being equal in length to the steering arms; said cranks also being disposed at equal angles to a center line parallel to the center lines of the steering arms and the same as the angle between the steering arms and the tie rod supporting arms; a drag link pivotally connected to the end of one steering arm and passing to the end of the farthermost steering crank, to which it is pivotally connected, a drag link pivotally connected to the end of the opposite steering arm and pivotally connected to the other steering crank, and means whereby the rock-shaft with its steering cranks may be actuated.

3. A steering mechanism comprising a pair of vertically pivoted steering knuckles mounted at the opposite ends of a vehicle axle, spindles extending outwardly from said knuckles, steering arms secured to said knuckles and disposed substantially at right angles to the spindles, tie rod supporting arms secured to said knuckles and disposed at equal angles to the steering arms and inclined toward each other; said arms being shorter than the steering arms and of equal length; a rigid tie rod pivotally connecting the tie rod supporting arms, a rock-shaft disposed in a vertical plane at a point in the rear of the tie rod and between the ends thereof, a pair of steering cranks secured to said rock-shaft; said cranks extending toward the tie rod and being equal in length to the steering arms; said cranks also being disposed at equal angles to a center line parallel to the center lines of the steering arms and the same as the angle between the steering arms and the tie rod supporting arms; a drag link pivotally connected to the end of one steering arm and passing to the end of the farthermost steering crank to which it is pivotally connected, a drag link pivotally connected to the end of the opposite steering arm and pivotally connected to the other steering crank, a worm wheel secured upon the rock-shaft and positioned between the steering cranks, a worm gear in mesh with said wheel, and a steering column upon which the worm gear is mounted and by which it is rotated.

In testimony whereof I have signed my name to this specification.

HENRY T. HAZARD.

Copies of this patent may be obtained for five cents each, by addressing the "Commissioner of Patents, Washington, D. C."